United States Patent Office 3,244,153
Patented Apr. 5, 1966

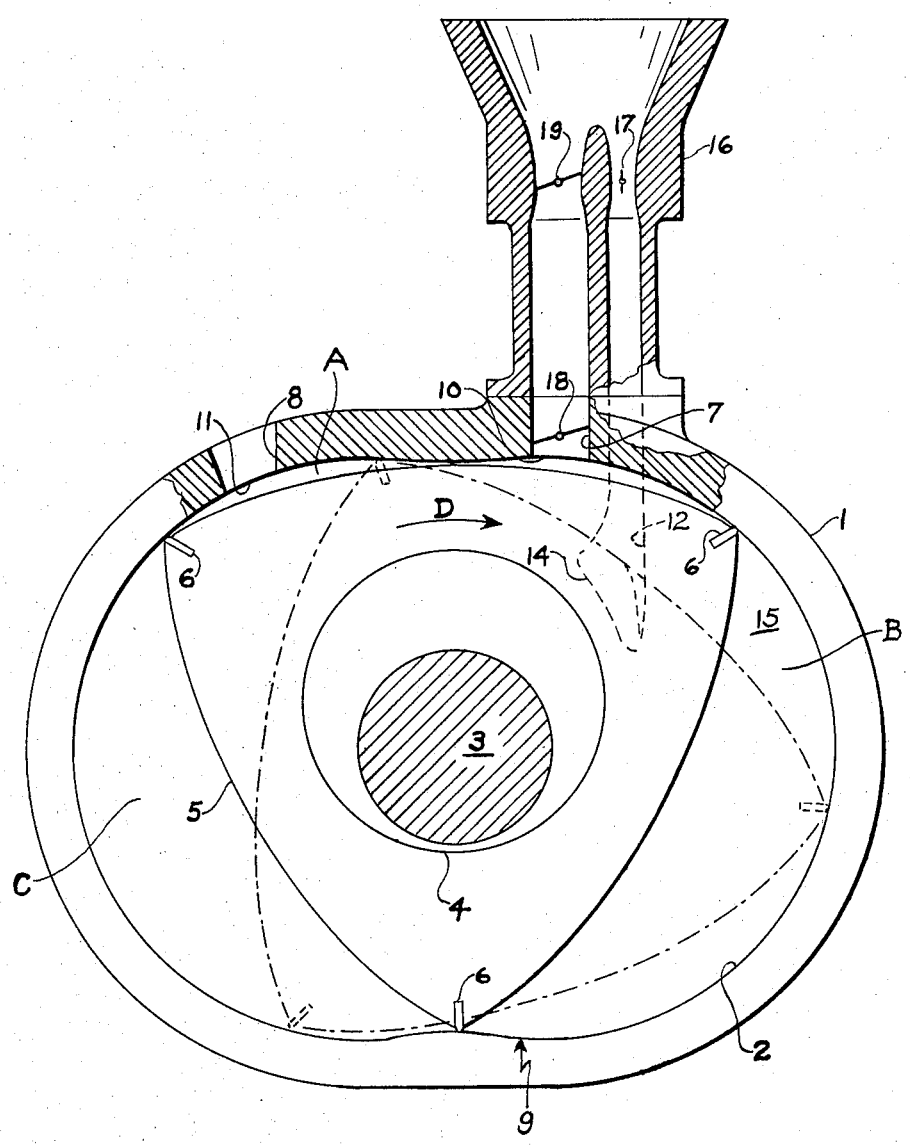

3,244,153
ROTARY COMBUSTION ENGINE
Walter Froede, Neckarsulm, Wurttemberg, Germany, assignor to NSU Motorenwerke Aktiengesellschaft, Neckarsulm, and Wankel G.m.b.H., Lindau (Bodensee), Germany
Filed June 28, 1963, Ser. No. 291,526
Claims priority, application Germany, July 27, 1962, N 21,903
4 Claims. (Cl. 123—8)

This invention relates to rotary combustion engines, and is particularly useful in connection with rotary combustion engines similar in general type to that disclosed in U.S. Patent No. 2,988,065.

Such a rotary combustion engine comprises an outer body having a cavity therein and an inner body disposed within the cavity, the inner body being rotatable relatively to the outer body about an axis spaced from but parallel to the axis of the cavity. The outer body has axially-spaced end walls and a peripheral wall interconnecting the end walls to form the cavity, the inner surface of the peripheral wall having a multi-lobed profile which preferably is basically an epitrochoid. The inner body has end faces disposed adjacent to the outer body end walls for sealing cooperation therewith, and has a peripheral surface with a plurality of circumferentially-spaced apex portions, each such apex bearing a radially movable seal for sealing engagement with the inner surface of the peripheral wall to form a plurality of working chambers which vary in volume on relative rotation of the two bodies. Each such apex seal extends in an axial direction from one end face to the other of the inner body. The number of apexes will usually exceed the number of lobes of the epitrochoid by one.

In the following discussion it will be assumed that the inner body is rotary and the outer body stationary. Accordingly, the inner body will be referred to as the rotor and the outer body as the housing. It will be understood, however, that the present invention is equally applicable to situations wherein the housing is rotary and the inner body stationary, or where both parts may be rotatable, as described in Patent No. 2,988,065.

For the purpose of introducing explosive charge and exhausting burned gases, there are provided in the housing gas inflow and outflow channels, the ports of which are overridden by the rotor. Internal combustion engines of this type have the advantage that they can be provided with intake ports of relatively large cross-section, which produces high volumetric efficiency and correspondingly high performance. However, when a large intake port is provided it is not possible to avoid some overlapping of induction and exhaust, particularly when both the intake and exhaust ports are disposed in the inner surface of the peripheral housing element. This partial overlap has little significance when the engine is operating under heavy load, but when operating under partial load and at low speed it has the result that some exhaust gas is transferred to the induction portion of the cycle, mixing with the fresh gas and reducing the amount of fresh gas which may be drawn in. This causes irregular running of the engine when under partial load.

The present invention eliminates this disadvantage by providing a separate induction channel for operating under partial load, having a separate intake port disposed in the housing, either in the peripheral element or in an end wall, and disposed at a location which is uncovered by the rotor only after the exhaust port has closed. In this manner the dilution of fresh gas by contamination with exhaust gas when operating partial load is avoided.

Both the main intake channel and the partial load channel may be supplied by a multiple-barrel carburetor, which opens the main induction channel only when the load on the engine reaches some selected value, such as 30% for example. In the higher load regions the suction on the main induction channel is low enough that only proportionately trivial amounts of exhaust gas pass over into the induction chamber during the period of overlap.

For reasons connected with gas-oscillation conditions, engines of this type usually have a long induction channel, in which case it is advantageous to provide, in the main induction channel and near the port in the inner peripheral surface of the intermediate housing element, obturating means which closes the main intake channel when operating under partial load, thus preventing exhaust gas from filling the induction channel. This obturating means may be simply the butterfly valve of the carburetor. However, since the valve of the carburetor would ordinarily be positioned at some distance from the intake port, it is advantageous to provide a second, separate obturating element close to the intake port.

The invention will be more fully understood on reading the following specification in connection with the accompanying drawing, which shows an axial view of an internal combustion engine with one end wall removed, the carburetor and a part of the peripheral housing being in cross-section.

There is shown a peripheral wall 1 having an inner surface 2 of multilobed form, preferably of basically epitrochoidal shape. The inner surface defines, together with the end walls, an internal cavity through which passes coaxial therewith a shaft 3 having an eccentric portion 4 disposed within the cavity. A multi-apexed rotor 5 is rotatably mounted on the eccentric 4. The rotor is provided with radially movable seals 6 at each apex, which seals slide continuously along the inner peripheral surface 2 as the rotor turns, whereby three variable-volume operating chambers A, B, and C are formed. The direction of rotation of the rotor is indicated by the arrow D.

In the peripheral wall 1 of the housing there is provided a main induction channel 7 for fresh gas, having a port 10 opening at the inner surface. There is also provided an ignition means, such as a sparkplug, shown schematically at 9, and an exhaust channel 8 for burned gases, having a port 11 opening at the inner surface of the peripheral wall. By this means a four-cycle combustion process, comprising intake, compression, expansion, and exhaust takes place in each operating chamber during each complete rotation of the rotor 5 on the eccentric 4. Both the intake port 10 and the exhaust port 11 are swept by the apexes of the rotor.

In the position illustrated, the rotor is in its top dead center position, wherein there is an overlap between exhaust and intake. That is, the intake port 10 and the exhaust port 11, with their respective induction channel 7 and exhaust channel 8, are in communication through operating chamber A. Chamber A is just completing the last portion of its exhaust cycle and just beginning its intake cycle, that is, chamber A is at its smallest volume. Therefore, it would be possible for some exhaust gas to penetrate into the main induction channel 7, particularly when operating at partial load and low speed, because in such a case a relatively high suction is produced in the main induction channel 7. Because of this factor, the formation of an ignitable charge is not assured.

In order to remedy this condition, the present invention provides an obturating element 18 in channel 7 adjacent to intake port 10 to prevent entry of exhaust gas into the main induction channel, and a special separate intake channel 12 having its own intake port 14. In the embodiment shown the separate channel 12 and its port 14 are disposed in one end wall 15; however, it will be understood that such a partial load channel and port may be disposed in either or both end walls, or in the peripheral wall. The partial load port 14 is disposed at such a location that it is uncovered by the rotor 5 only at such a time that the exhaust port is closed from the intaking chamber. This is shown in the drawing by the dashed-line position of the rotor, wherein the rotor apex has passed the exhaust port and the partial load port 14 is just about to be opened to begin the induction cycle. In this way contamination of the partial load mixture by exhaust gases is avoided, and smooth running under partial load is insured.

The main induction channel 7 and the partial load induction channel 12 are supplied with fuel-air mixture by a multiple-barrel carburetor 16. An obturating device, such as a butterfly valve 18, is positioned in the main induction channel 7, closing the main channel when the engine is operating under partial load and preventing the entry of exhaust gas into channel 7. The main barrel of the carburetor, communicating with induction channel 7, is provided with a throttle 19, and the partial load barrel, communicating with induction channel 12, is provided with a throttle 17.

Throttles 17 and 19 and the obturator 18 are so interconnected that the obturator and the main throttle 19 remain closed until throttle 17 is fully open, at some preselected load value, as for instance 30% of the engine rating. When the load increases beyond the selected value and partial throttle 17 is fully open, the main throttle 19 begins to operate to feed fuel-air mixture into the main induction channel. Obturator 18 may be so linked as to operate in correspondence with throttle 19, or may be so connected that it takes a fully open position as soon as throttle 19 begins to operate.

Although the invention has been described in a preferred embodiment, it is to be understood that the invention is not limited to the specific details of construction and arrangement shown and described herein, and that various changes and modifications may be made by one skilled in the art without departing from the scope of the invention. It is intended to cover all such modifications by the appended claims.

What is claimed is:

1. A rotary internal combustion engine, comprising in combination an outer body having a cavity therein having an axis, an inner body disposed within said cavity and rotatable relative to said outer body about an axis spaced from but parallel to said cavity axis, said outer body having axially spaced end walls and a peripheral wall interconnecting said end walls to form said cavity, the inner surface of said peripheral wall having a multi-lobed profile which is basically an epitrochoid, said inner body having end faces disposed adjacent to said end walls for sealing cooperation therewith and having a peripheral surface with a plurality of circumferentially-spaced apex portions, an apex seal member carried by each of said apex portions and engaging the inner surface of said peripheral wall in sealing relation to form a plurality of working chambers between the two bodies which vary in volume upon relative rotation of the two bodies, said outer body having a main intake port of relatively large cross-section opening into said cavity and having a relatively long main induction channel of relatively large cross-section communicating with said main intake port and having throttle means therein relatively remote from said main intake port, said outer body having an exhaust port therein communicating with an exhaust channel therethrough, said main intake port and said exhaust port being so disposed that they communicate simultaneously with the same working chamber during the last portion of the exhaust cycle, said main induction channel having an obturating element therein positioned adjacent to said main intake port and adjustable to prevent entry of exhaust gases thereinto against intake pressure in said main induction channel during partial-load operation, said outer body also having a partial-load intake port of smaller cross-section than said main intake port and opening into said cavity and having a partial-load induction channel communicating with said parallel-load intake port, said partial-load intake port being so disposed in said outer body that said partial-load intake port is open to a working chamber during the operating cycle only after said exhaust cycle in said chamber has been completed and after said inner body has closed said chamber from said exhaust port.

2. The combination recited in claim 1, wherein said partial-load intake port is disposed in an end wall of said outer body.

3. The combination recited in claim 1, wherein said obturating device is responsive to the load on said engine.

4. The combination recited in claim 3, wherein said obturating device is closed during load conditions below 30% load and open during load conditions above 30% load.

References Cited by the Examiner

UNITED STATES PATENTS

| 2,121,920 | 6/1938 | Mallory | 123—75 |
| 2,240,088 | 4/1941 | Birkigt | 123—75 |
| 2,244,214 | 6/1941 | Pescara | 123—75 |
| 2,316,618 | 4/1943 | Pyatt | 123—75 |
| 2,460,046 | 1/1959 | Vincent | 123—127 |
| 2,988,065 | 6/1961 | Wankel et al. | 123—8 |
| 3,062,435 | 11/1962 | Bentele | 123—8 X |

FOREIGN PATENTS 105,565   7/1924   Switzerland.

SAMUEL LEVINE, *Primary Examiner.*

JOSEPH H. BRANSON, JR., *Examiner.*